(12) United States Patent
Reynolds et al.

(10) Patent No.: US 11,900,638 B2
(45) Date of Patent: *Feb. 13, 2024

(54) SYSTEMS AND METHODS FOR ANALYZING COLORS

(71) Applicant: Behr Process Corporation, Santa Ana, CA (US)

(72) Inventors: Damien Reynolds, Huntington Beach, CA (US); Tanuja Singeetham, Pasadena, CA (US); Un Ho Chung, Santa Ana, CA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,911

(22) Filed: Feb. 27, 2023

(65) Prior Publication Data

US 2023/0222691 A1 Jul. 13, 2023

Related U.S. Application Data

(63) Continuation of application No. 17/140,174, filed on Jan. 4, 2021, now Pat. No. 11,593,965, which is a
(Continued)

(51) Int. Cl.
*G06T 7/90* (2017.01)
*G06F 3/0482* (2013.01)
(Continued)

(52) U.S. Cl.
CPC .............. *G06T 7/90* (2017.01); *G06F 3/0482* (2013.01); *G06Q 30/0201* (2013.01);
(Continued)

(58) Field of Classification Search
CPC ............ G06T 7/90; G06T 2207/10024; G06T 2207/20021; G06F 3/0482; G06Q 30/0201; G06Q 50/01; G06V 20/20; G06V 10/56
See application file for complete search history.

(56) References Cited

U.S. PATENT DOCUMENTS 7,230,629 B2 6/2007 Reynolds et al.
9,530,163 B2 12/2016 Buzyn et al.
(Continued)

OTHER PUBLICATIONS

Office Action regarding Chilean Patent Application No. 201801576, dated Jun. 28, 2019. Translation provided by Clarke Modet & Co.
(Continued)

*Primary Examiner* — Phuoc Tran
(74) *Attorney, Agent, or Firm* — Harness, Dickey & Pierce, P.L.C.

(57) ABSTRACT

Systems and methods for color selection are provided and include a non-transitory computer readable medium storing computer executable instructions that, when executed by a processor, configure the computing device to receive an image and determine a dominant color for the image by dividing the image into pixel groups, analyzing pixels in each of the pixel groups at different sample rates based on how close the pixel group is to the center of the image with pixel groups closer to the center of the image having a higher sample rate, and determining the dominant color for the image based on the analyzed pixels in each of the pixel groups. The instructions further configure the computing device to determine a closest matching paint color for the dominant color for the image and display a color name or a color code associated with the closest matching paint color for the dominant color.

22 Claims, 15 Drawing Sheets

Related U.S. Application Data continuation of application No. 16/003,899, filed on Jun. 8, 2018, now Pat. No. 10,885,672.

(60) Provisional application No. 62/519,657, filed on Jun. 14, 2017.

(51) Int. Cl.
  *G06Q 50/00* (2012.01)
  *G06Q 30/0201* (2023.01)
  *G06V 20/20* (2022.01)
  *G06V 10/56* (2022.01)

(52) U.S. Cl.
  CPC ............ *G06Q 50/01* (2013.01); *G06V 20/20* (2022.01); *G06T 2207/10024* (2013.01); *G06T 2207/20021* (2013.01); *G06V 10/56* (2022.01)

(56) References Cited

U.S. PATENT DOCUMENTS

| | | |
|---|---|---|
| 10,885,672 B2 | 1/2021 | Reynolds et al. |
| 11,593,965 B2 * | 2/2023 | Reynolds ............... G06V 20/20 |
| 2005/0100210 A1 | 5/2005 | Rice et al. |
| 2010/0194775 A1 | 8/2010 | Ou et al. |
| 2012/0045121 A1 | 2/2012 | Youngman et al. |
| 2015/0235389 A1 | 8/2015 | Miller et al. |
| 2015/0235398 A1 | 8/2015 | Kim et al. |
| 2019/0138168 A1 | 5/2019 | Vickers et al. |

OTHER PUBLICATIONS

Office Action regarding Mexican Patent Application No. MX/a/2018/007202, dated Oct. 4, 2023. Translation provided by Clarke & Modet. Co.

* cited by examiner

SYSTEMS AND METHODS FOR ANALYZING COLORS

CROSS-REFERENCE TO RELATED APPLICATIONS

This application is a continuation of U.S. application Ser. No. 17/140,174, filed Jan. 4, 2021, which is a continuation of U.S. application Ser. No. 16/003,899, filed Jun. 8, 2018, now U.S. Pat. No. 10,885,672, which claims the benefit of U.S. Provisional Application No. 62/519,657, filed on Jun. 14, 2017. The entire disclosures of the above applications are incorporated herein by reference.

FIELD

The present disclosure relates to analyzing colors and, more particularly, to color selection based on colors retrieved from analyzed images.

BACKGROUND

This section provides background information related to the present disclosure, which is not necessarily prior art.

Consumers typically begin a new painting project because of a desire for change. This typically stems from wanting a new look, wanting to change the feeling of a room, being tired of the old look, boredom, seeing an interior elsewhere, e.g., model home tour, friend's house, magazine photo, etc., The home painting process typically starts with color selection, which can be an emotional part of the process. Many consumers are concerned with making a mistake in the color selection process. Consequently, the color selection process can take several months to years to complete as the user settles on a color.

Current systems for color selection allow a consumer to browse and select particular colors electronically using, for example, a kiosk, a website, a web application, a mobile application, etc. For example, a color selection and coordination system that allows a user to select a starting color and that provides coordinating colors for the starting color is described in U.S. Pat. No. 7,230,629, titled "Data-driven color coordinator," which is incorporated herein by reference. For further example, an automated method and apparatus for providing color selection capability is described in U.S. Pat. No. 9,530,163, titled "Automated Color Selection Method and Apparatus," which is also incorporated herein by reference.

SUMMARY

This section provides a general summary of the disclosure, and is not a comprehensive disclosure of its full scope or all of its features.

The present disclosure provides a system comprising a mobile device having a mobile application configured to access a social media platform, retrieve a plurality of images from the social media platform, determine a dominant color for each image of the plurality of images, determine a closest matching paint color for the dominant color for each image, and display at least one of a color name and a color code associated with the closest matching paint color for the dominant color for each image.

In some configurations, the mobile application is further configured to determine and display a plurality of coordinating paint colors for the closest matching paint color for the dominant color for each image.

In some configurations, the mobile application is further configured to enable a user to select a different color than the dominant color for an image of the plurality of images, to determine a closest matching color for the different color, and to display at least one of a color name and a color code associated with the closest matching color for the different color.

In some configurations, the mobile application is further configured to upload an image that includes the closest matching paint color for the dominant color for each image to the social media platform.

In some configurations, the mobile application is further configured to receive a selection of a particular image from the plurality of images, identify an object displayed in the particular image, and store the identified object.

In another form, the present disclosure provides a method that includes retrieving, with a mobile device having a mobile application configured to access a social media platform, a plurality of images from the social media platform. The method also includes determining, with the mobile device, a dominant color for each image of the plurality of images. The method also includes determining, with the mobile device, a closest matching paint color for the dominant color for each image. The method also includes displaying, with the mobile device, at least one of a color name and a color code associated with the closest matching paint color for the dominant color for each image.

In some configurations, the method further comprises determining and displaying, with the mobile device, a plurality of coordinating paint colors for the closest matching paint color for the dominant color for each image.

In some configurations, the method also includes receiving, with the mobile device, a selection from a user of different color than the dominant color for an image of the plurality of images. The method also includes determining, with the mobile device, a closest matching color for the different color. The method also includes displaying, with the mobile device, at least one of a color name and a color code associated with the closest matching color for the different color.

In some configurations, the method also includes uploading, with the mobile device, an image that includes the closest matching paint color for the dominant color for each image to the social media platform.

In some configurations, the method also includes receiving, with the mobile device, a selection of a particular image from the plurality of images, identifying an object displayed in the particular image, and storing the identified object.

In another form, the present disclosure provides a non-transitory computer readable medium storing a mobile application for a mobile device. The mobile application includes computer executable instructions to configure the mobile device to access a social media platform, retrieve a plurality of images from the social media platform, determine a dominant color for each image of the plurality of images, determine a closest matching paint color for the dominant color for each image, and display at least one of a color name and a color code associated with the closest matching paint color for the dominant color for each image.

In some configurations, the mobile application further includes computer executable instructions to configure the mobile device to determine and display a plurality of coordinating paint colors for the closest matching paint color for the dominant color for each image.

In some configurations, the mobile application further includes computer executable instructions to configure the mobile device to enable a user to select a different color than the dominant color for an image of the plurality of images, to determine a closest matching color for the different color, and to display at least one of a color name and a color code associated with the closest matching color for the different color.

In some configurations, the mobile application further includes computer executable instructions to configure the mobile device to upload an image that includes the closest matching paint color for the dominant color for each image to the social media platform.

In some configurations, the mobile application further including computer executable instructions to configure the mobile device to receive a selection of a particular image from the plurality of images, identify an object displayed in the particular image, and store the identified object.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
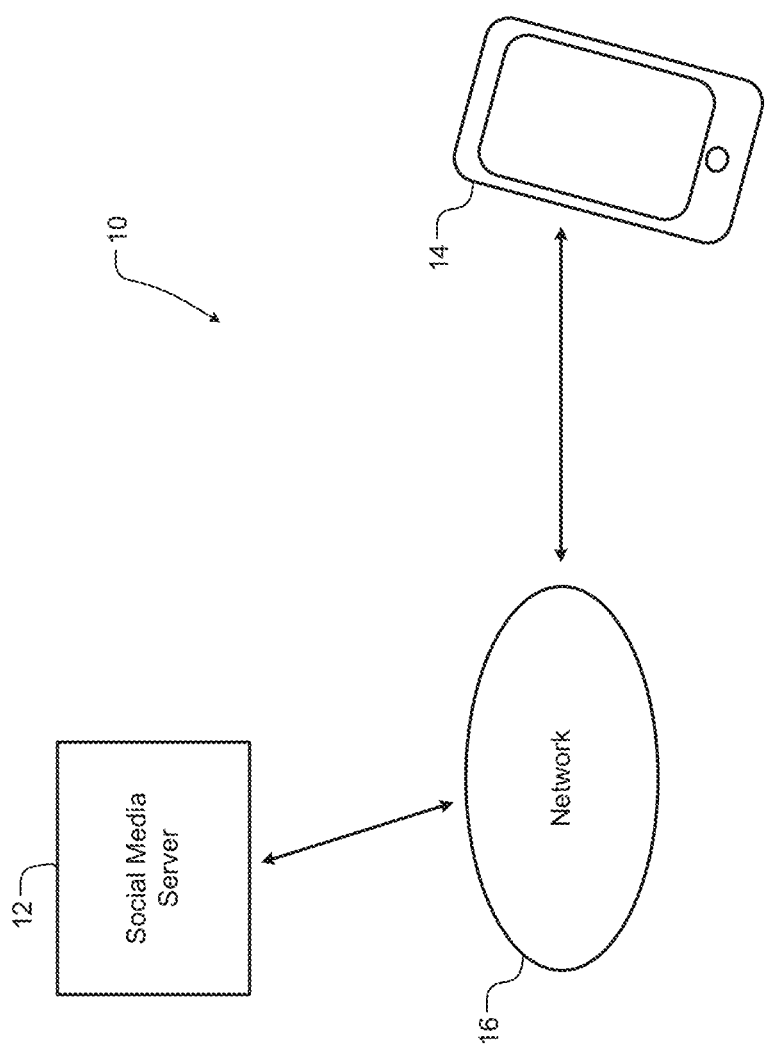
FIG. 1 is a block diagram of a system for analyzing colors from a social media platform according to the present disclosure.

Example embodiments will now be described more fully with reference to the accompanying drawings.

The present disclosure includes systems and methods for analyzing colors in images retrieved from a social media platform. For example, the social media platform may include a platform for uploading, saving, sorting, managing, and sharing images and/or collections of images. For example, a user may browse images uploaded by other users and may tag, bookmark, or save an image or collection of images that can then be later retrieved and viewed in the user's own area of the social media platform. For example, the social media platform may be implemented through a mobile application, a website, and/or a web application. For example, the social media platform may be the PINTEREST® social media platform by Pinterest, Inc., currently available at www.pinterest.com and through a mobile application. The systems and methods of the present disclosure can then analyze the images saved in the user's own area of the social media platform and present one or more dominant colors from each of the images. In particular, for each of the dominant colors determined from each of the images, the systems and methods of the present disclosure can determine a closest matching paint color associated with each of the dominant colors and can present the user with information, such as a paint color name and identification code, associated with each of the closest matching paint colors.

Once the paint colors are determined, the systems and methods of the present disclosure can provide coordinating colors or coordinating color palettes for each of the paint colors. The systems and methods of the present disclosure can be integrated with other color coordination systems and methods that allow the user to view the particular paint colors in a simulated environment. For example, color coordination systems and methods that enable a user to view particular colors in a simulated environment are described in U.S. Pat. No. 7,230,629, titled "Data-driven color coordinator," which is incorporated herein by reference. The systems and methods of the present disclosure can also enable a user to order samples of particular paint colors and save information associated with the particular paint colors, such as color names and identification codes, on a server for later retrieval by the user.

Further, once particular paint colors, coordinating paint colors, and/or coordinating paint color palettes are determined or selected, the systems and methods of the present disclosure can generate an image of the particular paint colors, coordinating paint colors, and/or coordinating paint color palettes that can be uploaded and saved into the user's area of the social platform and shared with other users of the social media platform.

In this way, a user can browse images within the social media platform seeking inspiration for colors for a paint project. The user can then easily translate dominant colors from particular images retrieved from the social media platform into paint colors and can view associated coordinating colors. As such, the systems and methods of the present disclosure can assist a user in quickly determining particular paint colors for a paint project.

With reference to FIG. 1, a block diagram of a system 10 for analyzing colors from a social media platform according to the present disclosure is shown. The system 10 includes a social media server 12 and a mobile device 14 in communication over a network 16. The social media server 12 may be configured with one or more processors and with memory that stores content, such as images. The network 16 may be a local area network (LAN) or a wide area network (WAN), such as the internet. The social media server 12 includes a network communication module to communicate with the mobile device 14 over the network 16.

The social media server 12 may host a social media platform for uploading, saving, sorting, managing, and sharing images and/or collections of images. For example, the social media server 12 may host the P INTEREST® social media platform. In the example of the PINTEREST® social media platform, images are referred to as "pins." The images or pins are then saved to the user's "pinboards" or "boards." Users can browse each other's boards and save particular images to their own boards. In this way, a user can save particular images or pins that are interesting, inspirational, and/or that show particular colors of interest to the user's own board or area of the PINTEREST® social media platform. As such, the user can build up a collection of images or pins in the user's own board or area of the PINTEREST® social media platform.

The systems and methods of the present disclosure can be implemented through a mobile application. For example, the mobile device 14 can be a smartphone or a tablet device configured with a processor, a memory, and an input/output device, such as a touchscreen. The mobile device 14 includes a network communication module to communicate with the social media server 12 over the network 16. The systems and methods of the present disclosure can be implemented through a mobile application installed on the mobile device 14.

Figure 2:
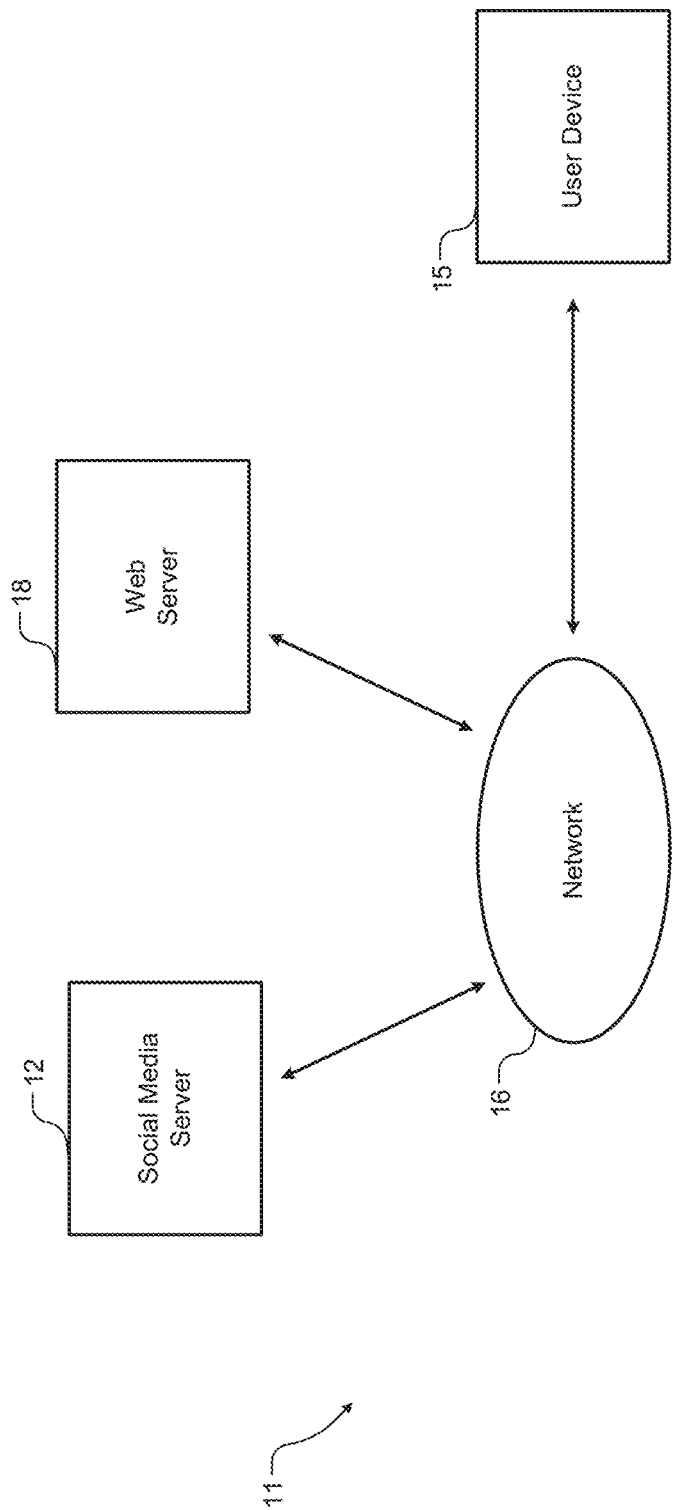
FIG. 2 is a block diagram of another system for analyzing colors from a social media platform according to the present disclosure.

Additionally or alternatively, the systems and methods of the present disclosure can be implemented using webpages and/or web applications. For example, with reference to FIG. 2, a block diagram of another system 11 for analyzing colors from a social media platform according to the present disclosure is shown. In FIG. 2, a user device 15 is in communication with the social media server 12 and a web server 18. The web server 12 may be configured with one or more processors and with memory that stores content, such as webpages in Hypertext Markup Language (HTML), accessible to the user device 15 via a web browser that navigates to a website associated with the web server. For further example, the color selection system 11 may be implemented within a web application, whereby the web server 18 provides code for the web application to the user device 15 and the web application runs in a web browser of the user device 15. Additionally or alternatively, the system 11 according to the present disclosure may be implemented with a standalone application that runs on the user device 15 outside of a browser while communicating with the web server 18 and the social media server 12. The social media server 12 and the web server 18 each include a network communication module to communicate with the user device 15 over the network 16.

The user device 15 is a computing device with input devices, such as a keyboard and a mouse, and a display device such as a display screen. Additionally or alternatively, the user device 14 may include a touch screen device that both receives user input and displays output. The user device 15 includes one or more processors and memory. The memory of the user device 15 may store code for a web browser that accesses and retrieves content from websites, such as the website associated with the web server 18. The memory of the user device 15 may also store code for a mobile application that provides the functionality of the color selection systems and methods of the present disclosure. The user device 15 may include a personal computer, a laptop, a tablet, and/or a mobile device, such as a smartphone, that utilizes a web browser. The user device 15 includes a network communication module to communicate with the social media server 12 and the web server 18 over the network 16.

While examples of the systems and methods of the present disclosure are discussed with reference to a mobile application for a mobile device 14, such as a smartphone or tablet device, as shown in FIG. 1, the systems and methods of the present disclosure can be similarly implemented through a website or web application that runs in a web browser of a user device 15, as shown in FIG. 2.

Figure 3:
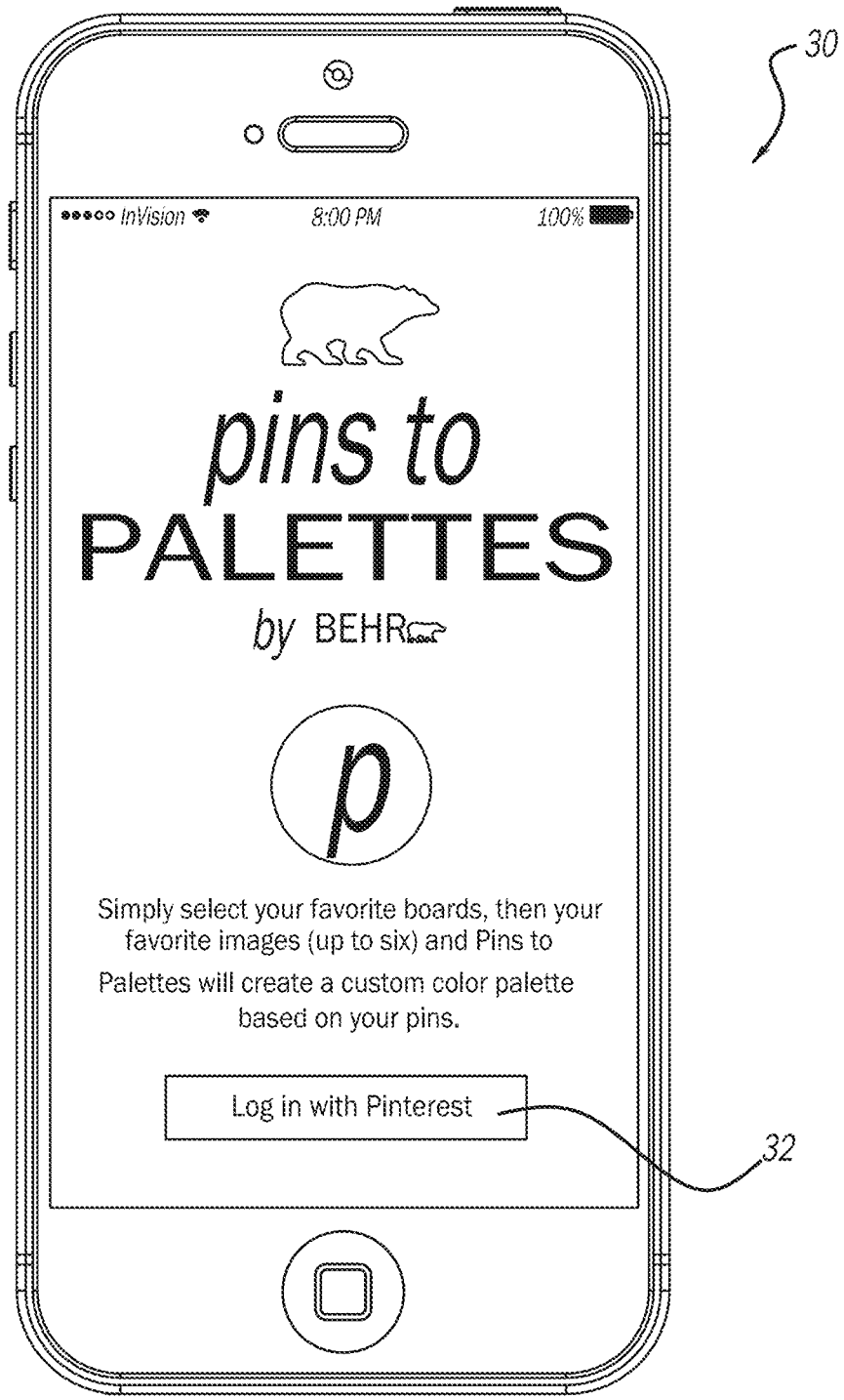
FIG. 3 is a screenshot of a system for analyzing colors from a social media platform according to the present disclosure.

With reference to FIG. 3, a screenshot of a first page 30 of a mobile application for implementing the system 10 according to the present disclosure is shown. The first page 30 includes a button 32 for logging into the mobile application. The mobile application of the present disclosure can be integrated with a social media platform through an Application Programming Interface, or API, made available for the social media platform. For example, as discussed, the social media platform may include the PINTEREST® social media platform and the mobile application of the present disclosure may integrate with the PINTEREST® social media platform using the PINTEREST® API. For example, a user of the mobile application of the present disclosure may login in to the mobile application using the user's login and password for the social media platform, such as the PINTEREST® social media platform. The mobile application may then user the API of the social media platform, such as the PINTEREST® API, to access the user's saved content on the social media platform. For example, in the example of the PINTEREST® social media platform, the mobile application may use the PINTEREST® API to access and retrieve pins or images saved by the user on the user's the PINTEREST® board. Once the user clicks the login button 32, a second page 40 (shown in FIG. 4) is displayed on the display of the mobile device 14.

Figure 4:
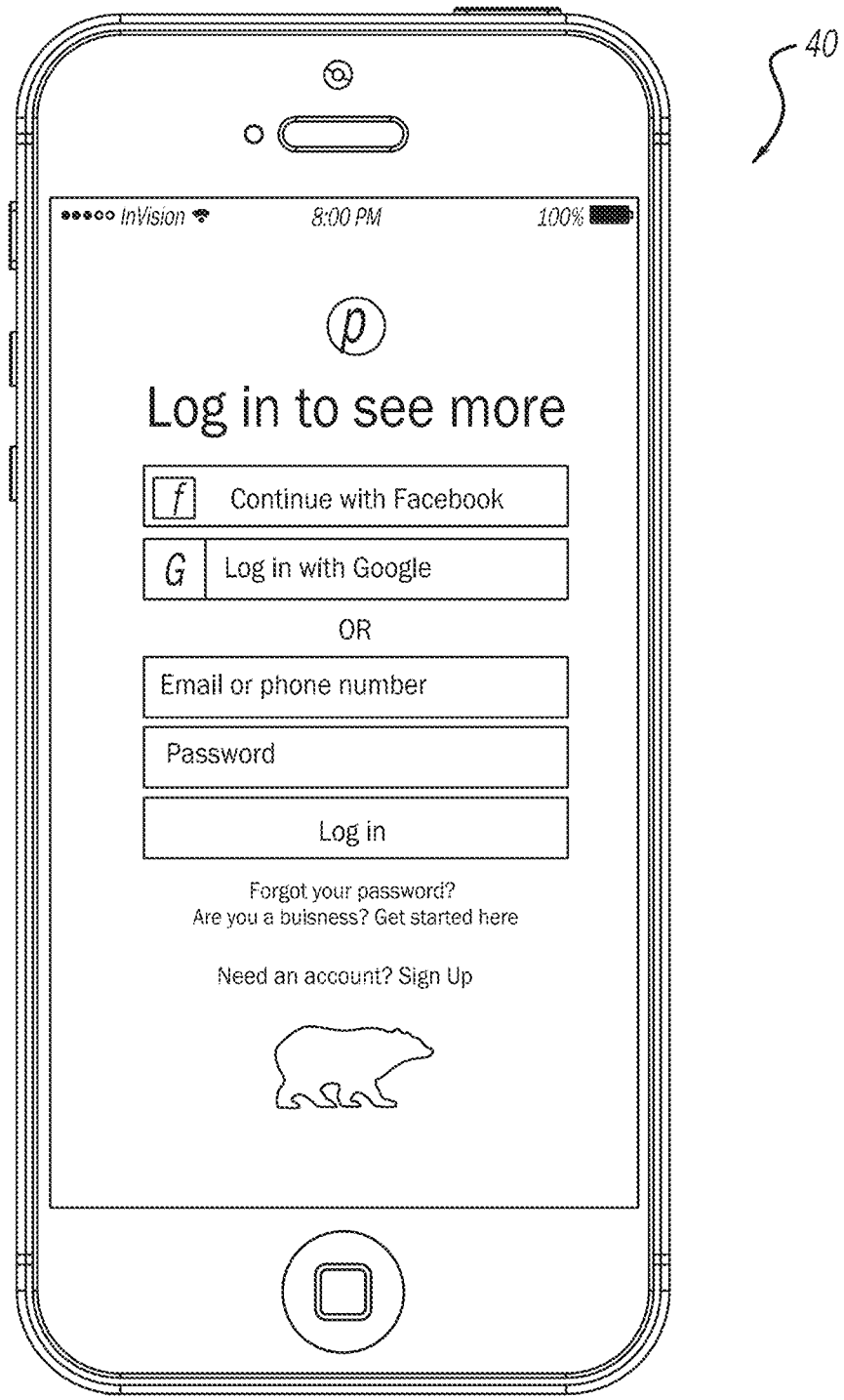
FIG. 4 is a screenshot of a system for analyzing colors from a social media platform according to the present disclosure.

With reference to FIG. 4, the second page 40 includes multiple options to enable the user to login. For example, the user can login using a login associated with the user's FACEBOOK® account. Additionally or alternatively, the user can login using a login associated with the user's GOOGLE® account. Additionally or alternatively, the user can login with an email or phone number and a password. Once the user logs in, the mobile application can access and display content from the user's area of the social media platform.

Figure 5:
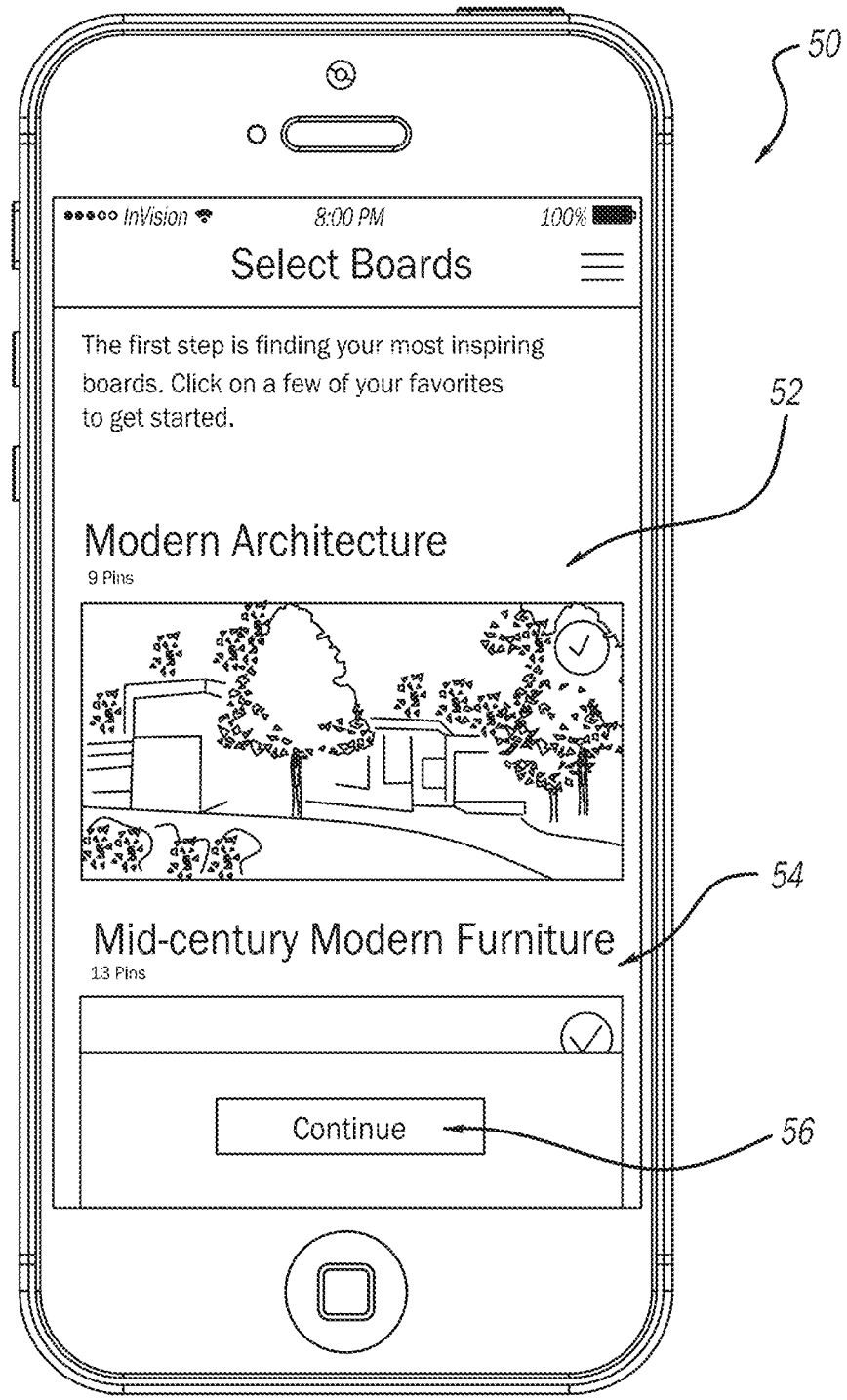
FIG. 5 is a screenshot of a system for analyzing colors from a social media platform according to the present disclosure.

For example, as shown in FIG. 5, the mobile application can display a third page 50 that includes collections of images retrieved from the user's area of the social media platform. For example, using the PINTEREST® social media platform example, the mobile application can retrieve boards, or collections of images, that have been saved by the user or that are being followed by the user. In the example of the third page 50 shown in FIG. 5, the user has selected two boards 52, 54. The first board 52 is titled "Modern Architecture" and includes nine pins or images. The second board 54 is titled "Mid-century Modern Furniture" and includes 13 pins or images. Once the user has selected one or more boards, the user press the "continue" button 56 and a fourth page 60 (shown in FIG. 6) is displayed on the display of the mobile device 14.

Figure 6:
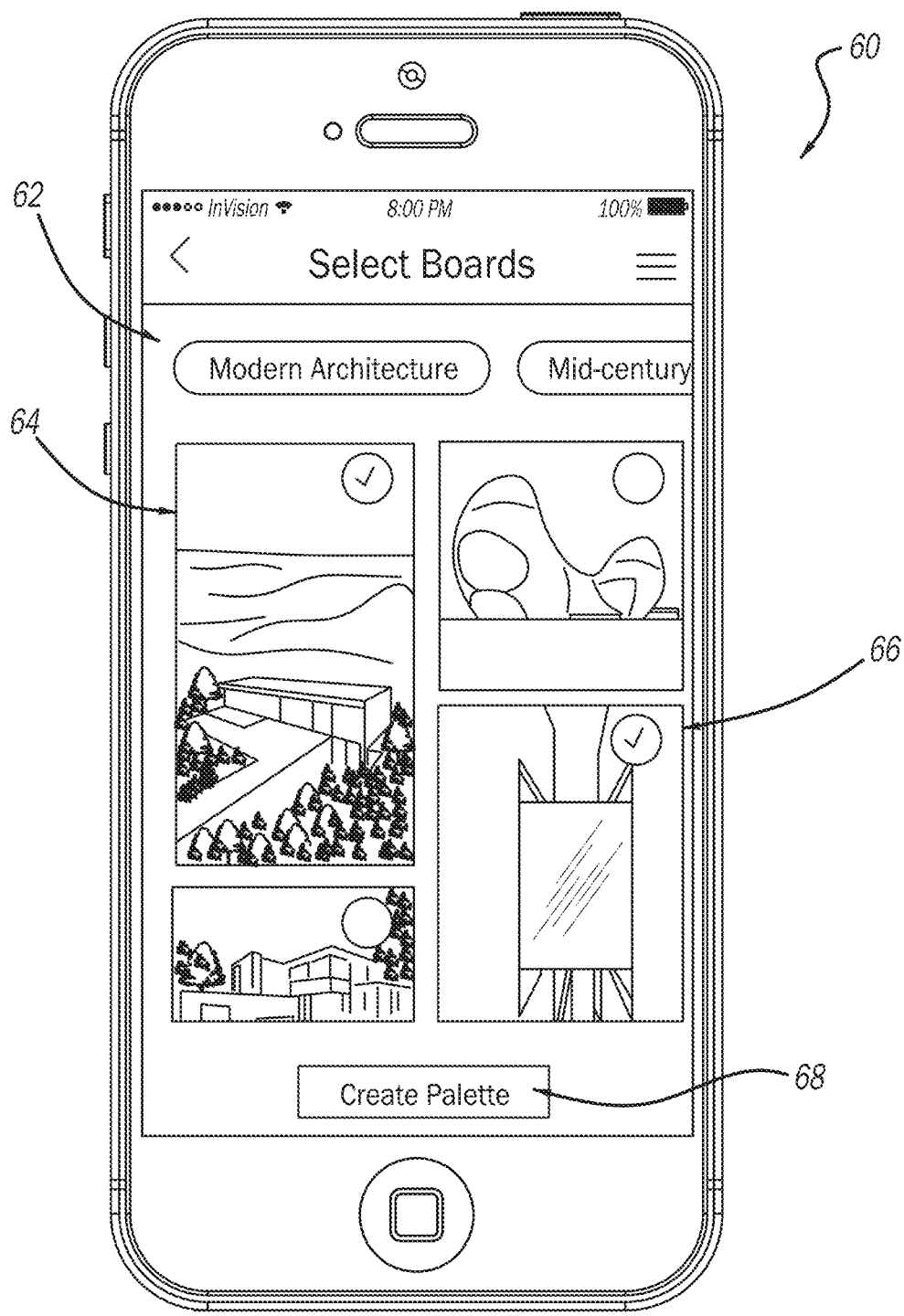
FIG. 6 is a screenshot of a system for analyzing colors from a social media platform according to the present disclosure.

With reference to FIG. 6, the fourth page 60 prompts the user to select individual images or pins from the boards selected in the previous step. For example, the third page 60 includes a board bar 62 that can be swiped left and/or right to view the various boards selected in the previous step. In the example of FIG. 6, the Modern Architecture board is selected and the individual pins or images saved within that board are displayed below the board bar 62. The user can then select individual images or pins from each board. In the example of FIG. 6, the user has selected a first image 64 and a second image 66 from the Modern Architecture board. The user may select up to a predetermined number of pins or images. For example, the mobile application may limit the user to selection of up to six pins or images. Once the user has selected the desired pins or images, the user can press the "Create Palette" button 68. Once the user presses the "Create Palette" button 68, a fifth page 70 (shown in FIG. 7) is displayed on the display of the mobile device 14.

Figure 7:
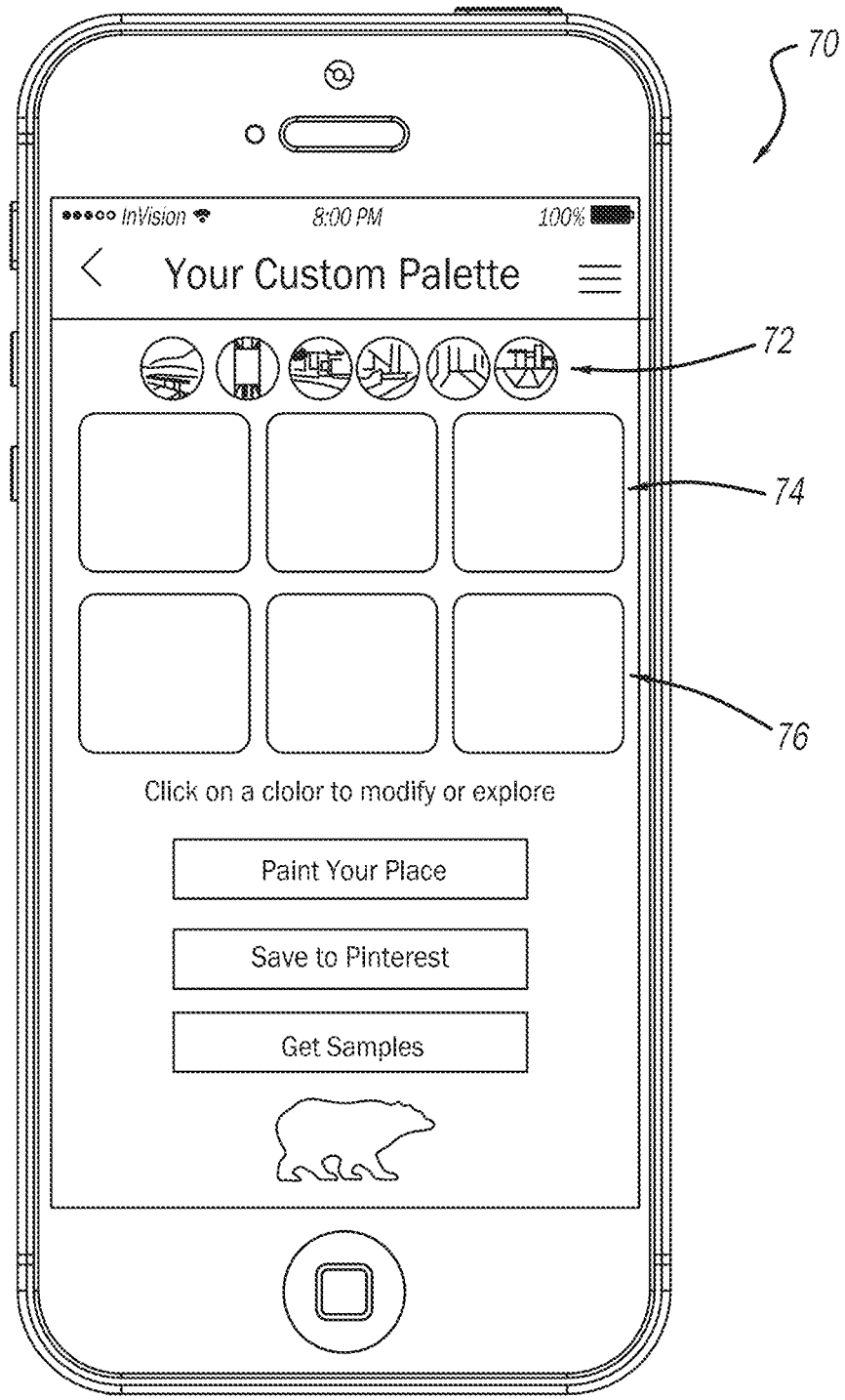
FIG. 7 is a screenshot of a system for analyzing colors from a social media platform according to the present disclosure.

With reference to FIG. 7, the fifth page 70 displays a color associated with each image or pin selected in the previous step. As discussed in further detail below with respect to the image analysis tool, the mobile application can analyze the pixels in each image or pin and select a dominant color associated with each image or pin. As shown in the example of FIG. 7, a thumbnail bar 72 is shown across the top of the fifth page 70 displaying a thumbnail version of each image or pin selected in the previous step. In addition two rows 74, 76 are shown beneath the thumbnail bar 72. The top row 74 displays three colors associated with the leftmost thumbnail images in the thumbnail bar 72. The bottom row 76 displays three colors associated with the rightmost thumbnail images in the thumbnail bar 72. The fifth page 70 also provides the user with an option to click on a color to modify or explore that color. The fifth page 70 also provides the user with an option to click on "Paint Your Place" button 77 to enable the user to view one or more of the colors in a simulated environment. The fifth page 70 also provides the user with an option to "Save to Pinterest" button, which saves the collection of colors in an image that is then saved to the user's board or area of the social media platform, such as the PINTEREST® social media platform. The fifth page 70 also provides the user with an option to "Get Samples" button, which enables the user to order paint samples for one or more of the displayed colors in the first and second rows 74, 76. When the user clicks on a particular color, a sixth page 80 (shown in FIG. 8) is displayed on the display of the mobile device 14.

Figure 8:
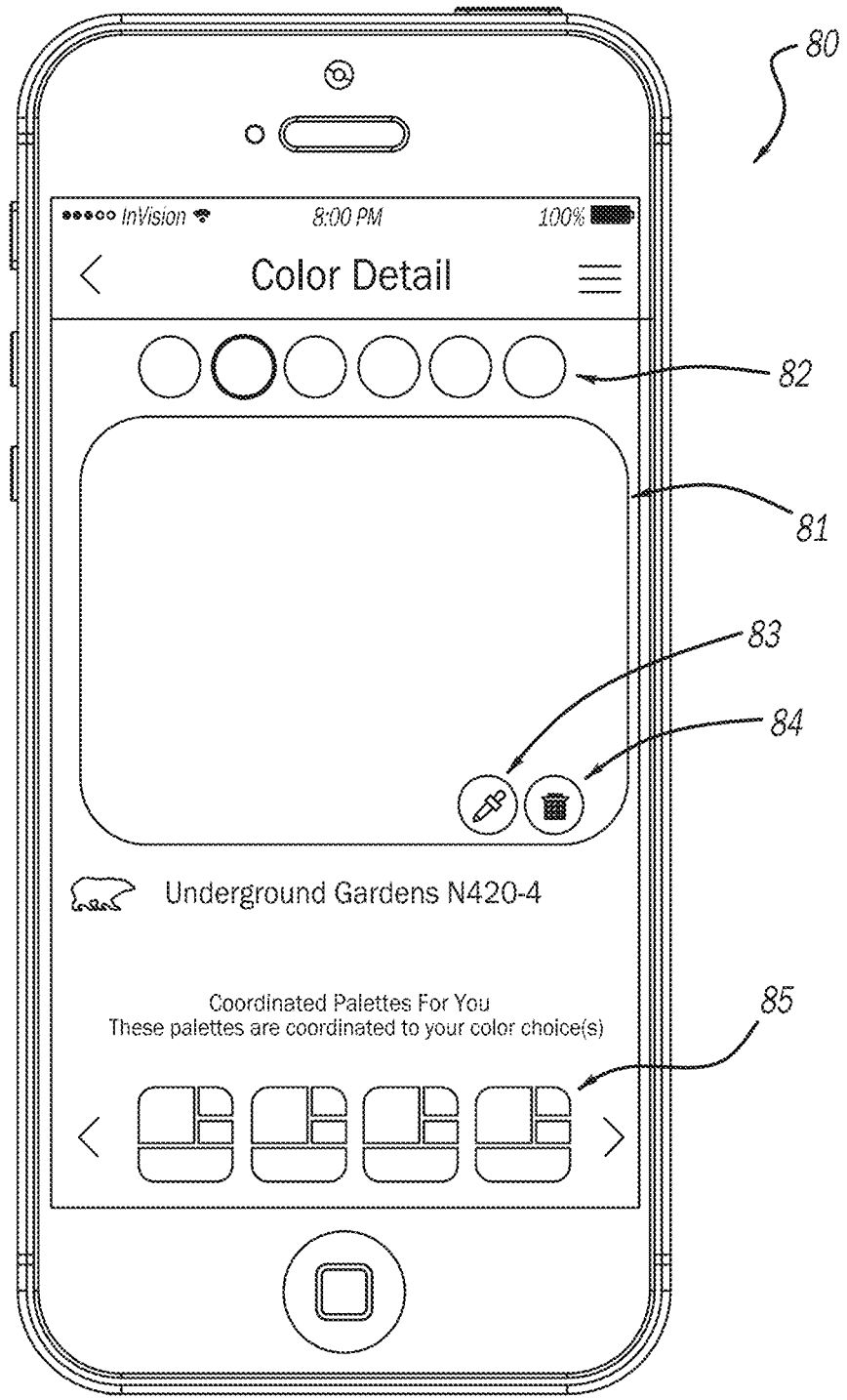
FIG. 8 is a screenshot of a system for analyzing colors from a social media platform according to the present disclosure.

With reference to FIG. 8, the sixth page 80 displays a particular color 81 selected from the individual colors presented in the previous step. In the example of FIG. 8, an enlarged square of the particular color 81 is displayed in a central region of the sixth page 80, while a color bar 82 shows all six individual colors from the previous step. The particular color selected is highlighted in the color bar 82 by being surrounded by a darker circle to indicate it is the currently selected color. The name of the particular color 81 is displayed below the particular color 81. In the case of FIG. 8, the name of the particular color 81 is "Underground Gardens" and the identification code associated with the color is N420-4. In addition, the sixth page 80 displays coordinated palettes 85 for the particular color. For example, each color coordinated palette of the coordinated palettes 85 shows the particular color along with one or more coordinating colors for the particular color. While four coordinated palettes 85 are shown in FIG. 8, the user can retrieve additional coordinated palettes 85 by scrolling to the left or to the right using the arrow buttons. As further shown in FIG. 8, a delete button 84 is provided to allow the user to delete the particular color from the group of colors shown in the color bar 82. As further shown in FIG. 8, an edit button 83 is provided to enable the user to choose a different color from the pin or image associated with the particular color. When the user clicks on the edit button 83, a seventh page 90 (shown in FIG. 9) is displayed on the display of the mobile device 14.

Figure 9:
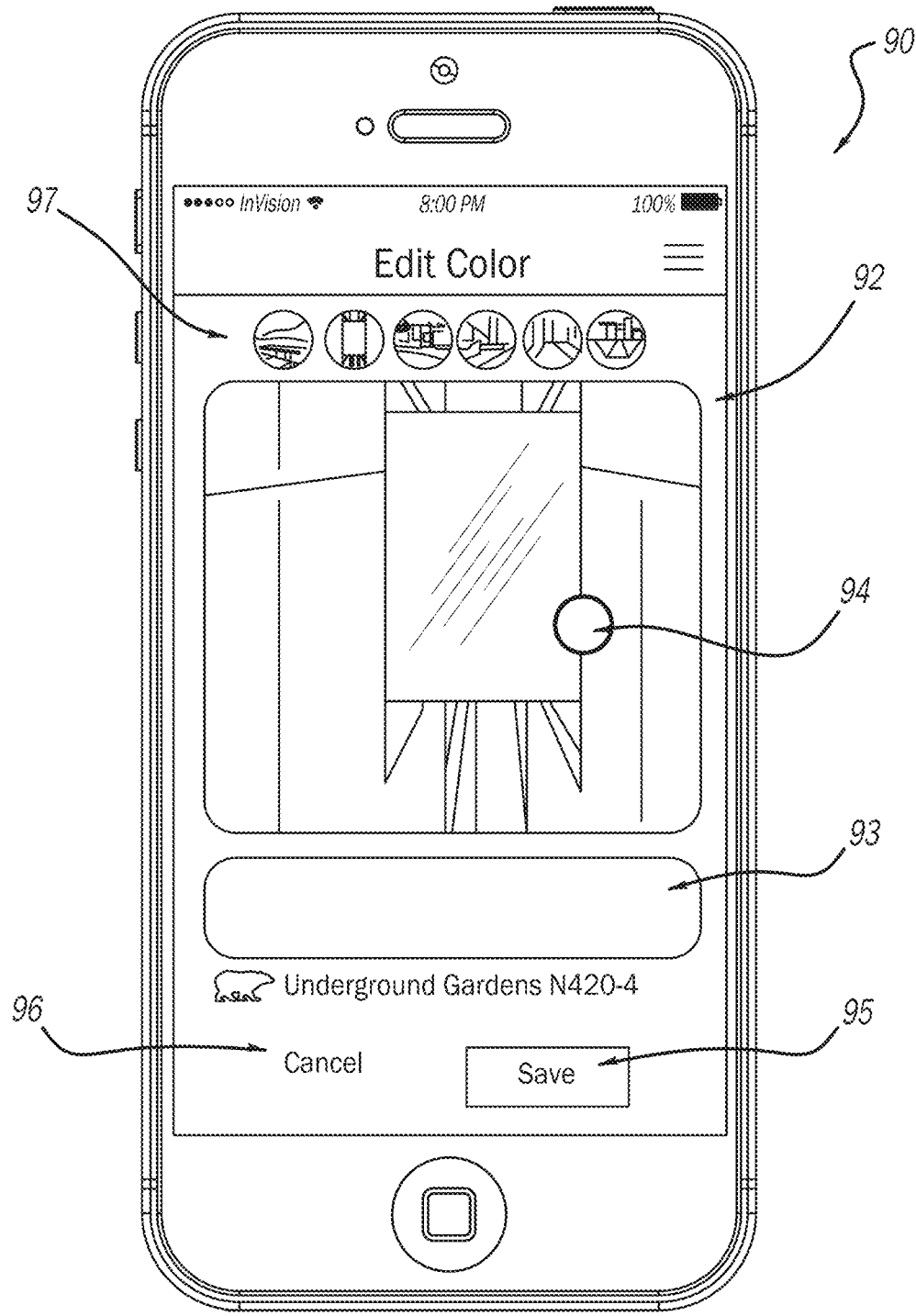
FIG. 9 is a screenshot of a system for analyzing colors from a social media platform according to the present disclosure.

With reference to FIG. 9, the seventh page 90 displays the particular pin or image 92 associated with the particular color 81 from the previous step. A smaller rectangle of the particular color 93 from the previous step is shown below the particular pin or image 92. In addition, a color selection tool 94 appears in the particular pin or image 92 at an initial location corresponding to one or more pixels that correspond to the particular color. The user can then drag the color selection tool 94 to other locations within the particular pin or image 92 to view other colors within the pin or image 92. For example, once the color selection tool 94 is moved to another location within the particular pin or image 92, the particular color 93 is updated to another color that is the closest matching paint color to the color in the particular pin or image 92 at the location indicated by the color selection tool 94. For example, the mobile device 14 may have access to a paint color database and may search the paint color database to find a closest matching paint color to the selected color in the particular pin or image 92 at the location indicated by the color selection tool 94 by comparing color values, such as, for example, RBG (red, green, blue) color values, CMYK (cyan, magenta, yellow and key/black) color values, and/or CIE XYZ color values, of the selected color to color values of individual paint colors in the paint color database. Systems and methods for determining a closest matching paint color to a particular color are described, for example, in commonly assigned U.S. Pat. No. 9,928,543, titled Data-Driven Color Coordinator, issued on Mar. 27, 2018, which is incorporated herein in its entirety. The paint color database may be stored on the mobile device 14 or may be stored remotely such that the mobile device 14 can access the paint color database via communication over the network 16. Once the user has selected a new color from the particular pin or image 92, the user can then click the save button 95 to save the new color to the group of selected colors from the previous steps in place of the originally provided color. Alternatively, the user can click the cancel button to cancel the current editing process. In addition, a thumbnail bar 97 is shown above the particular pin or image 92. The user can click on a different pin or image from the thumbnail bar and similarly edit the color associated with that pin or image.

Returning to FIG. 7, once the user is satisfied with the group of colors, the user can select the "Save to Pinterest" button to save an image of the group of colors to the user's area of the social media platform. For example, the user can save an image of the group of colors to a particular board within the PINTEREST® social media platform. Once the user clicks the "Save to Pinterest" button 78, an eighth page 100 (shown in FIG. 10) is displayed on the display of the mobile device 14.

Figure 10:
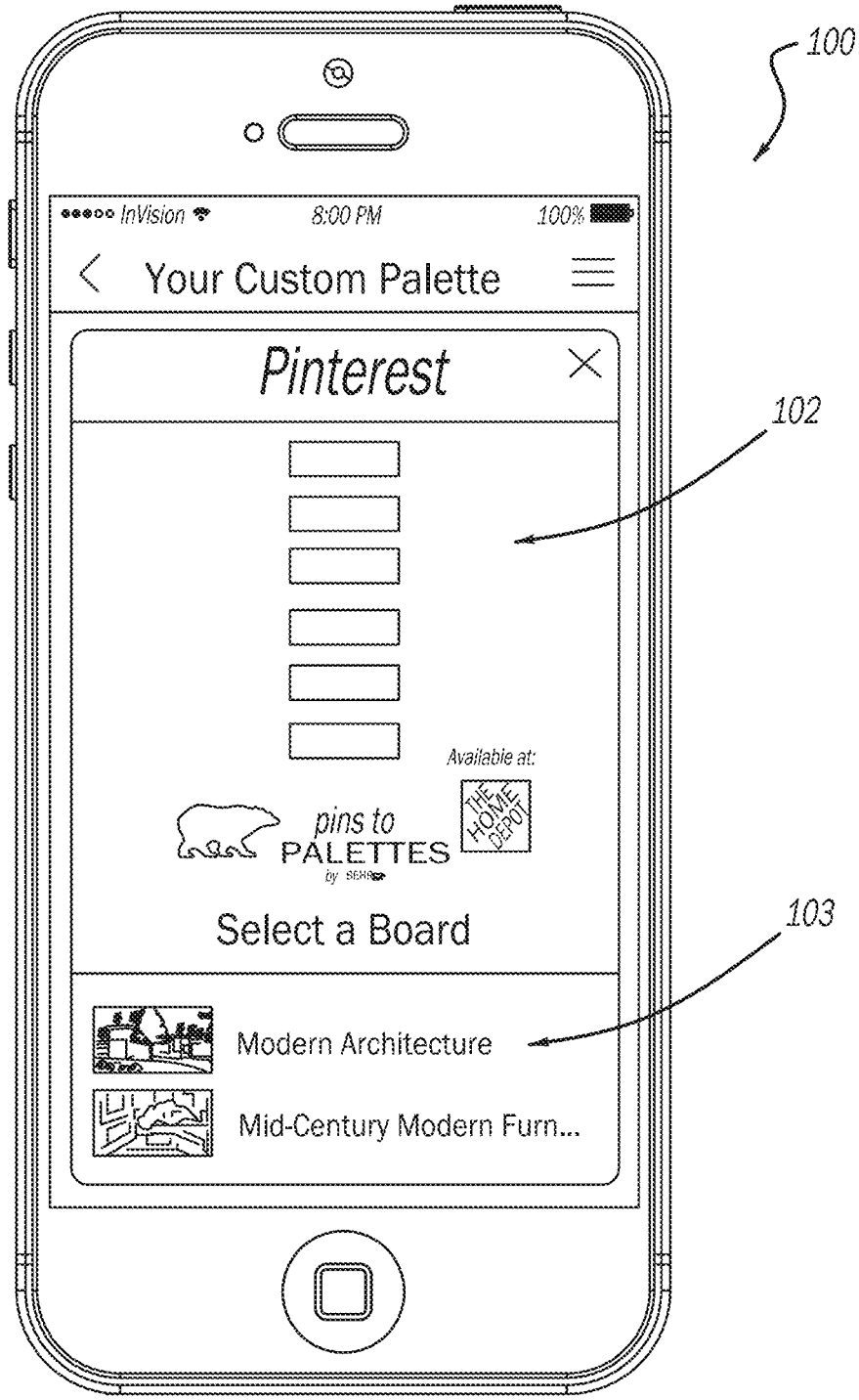
FIG. 10 is a screenshot of a system for analyzing colors from a social media platform according to the present disclosure.

With reference to FIG. 10, the eighth page 100 displays an image 102 of the group of colors from the previous steps. The eighth page also prompts the user to select a particular board or group of images from the social media platform. For example, the user can select the Modern Architecture board 103, shown in FIG. 10. Once the user selects a particular board, a ninth page 110 (shown in FIG. 11) is displayed on the display of the mobile device 14.

Figure 11:
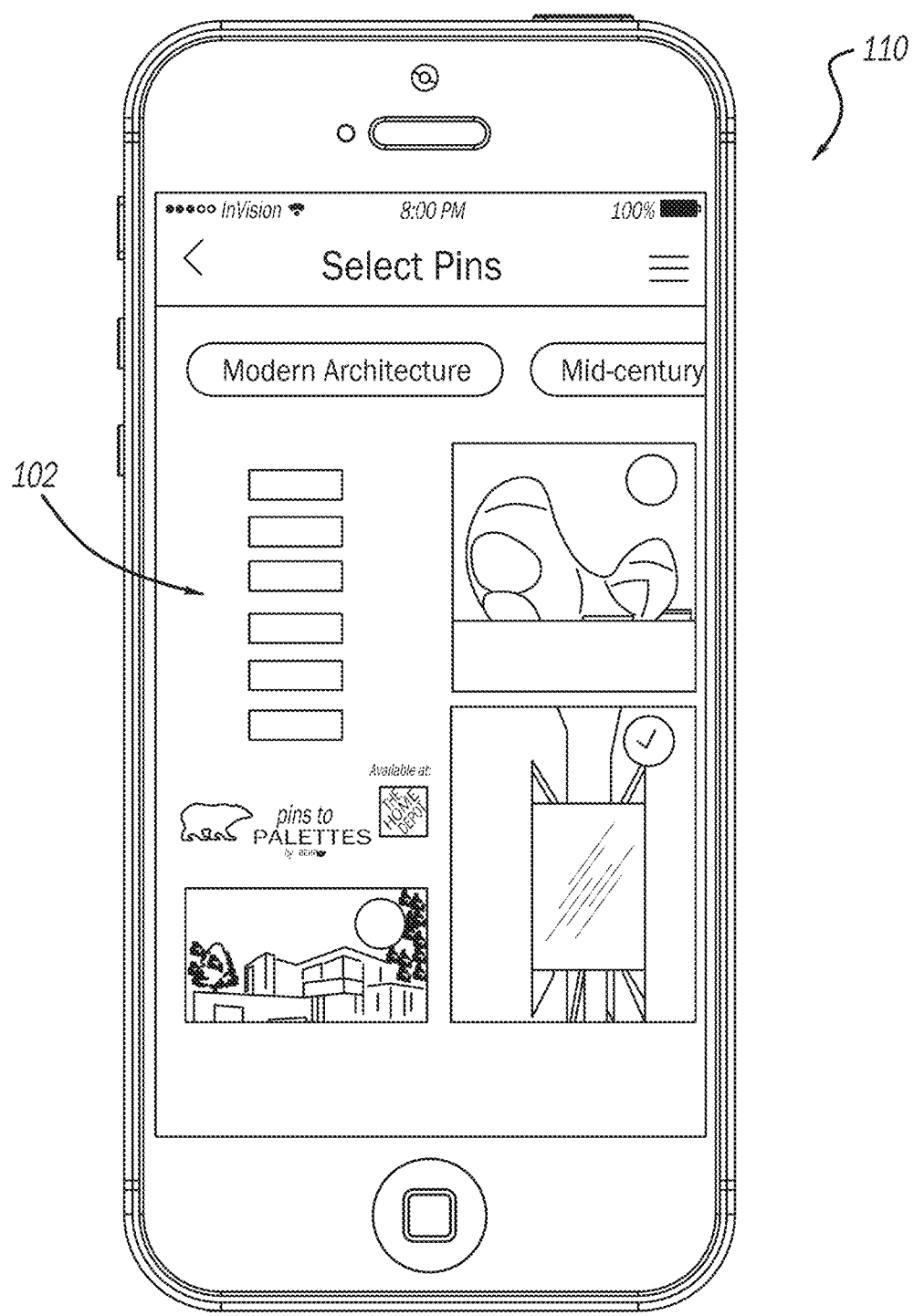
FIG. 11 is a screenshot of a system for analyzing colors from a social media platform according to the present disclosure.

With reference to FIG. 11, the ninth page 110 shows the image 102 of the group of colors displayed on the board selected in the previous step, e.g., the Modern Architecture board. At this point, the mobile application returns to the fourth page 60 shown in FIG. 6 and prompts the user to select individual images to create a palette.

Figure 12:
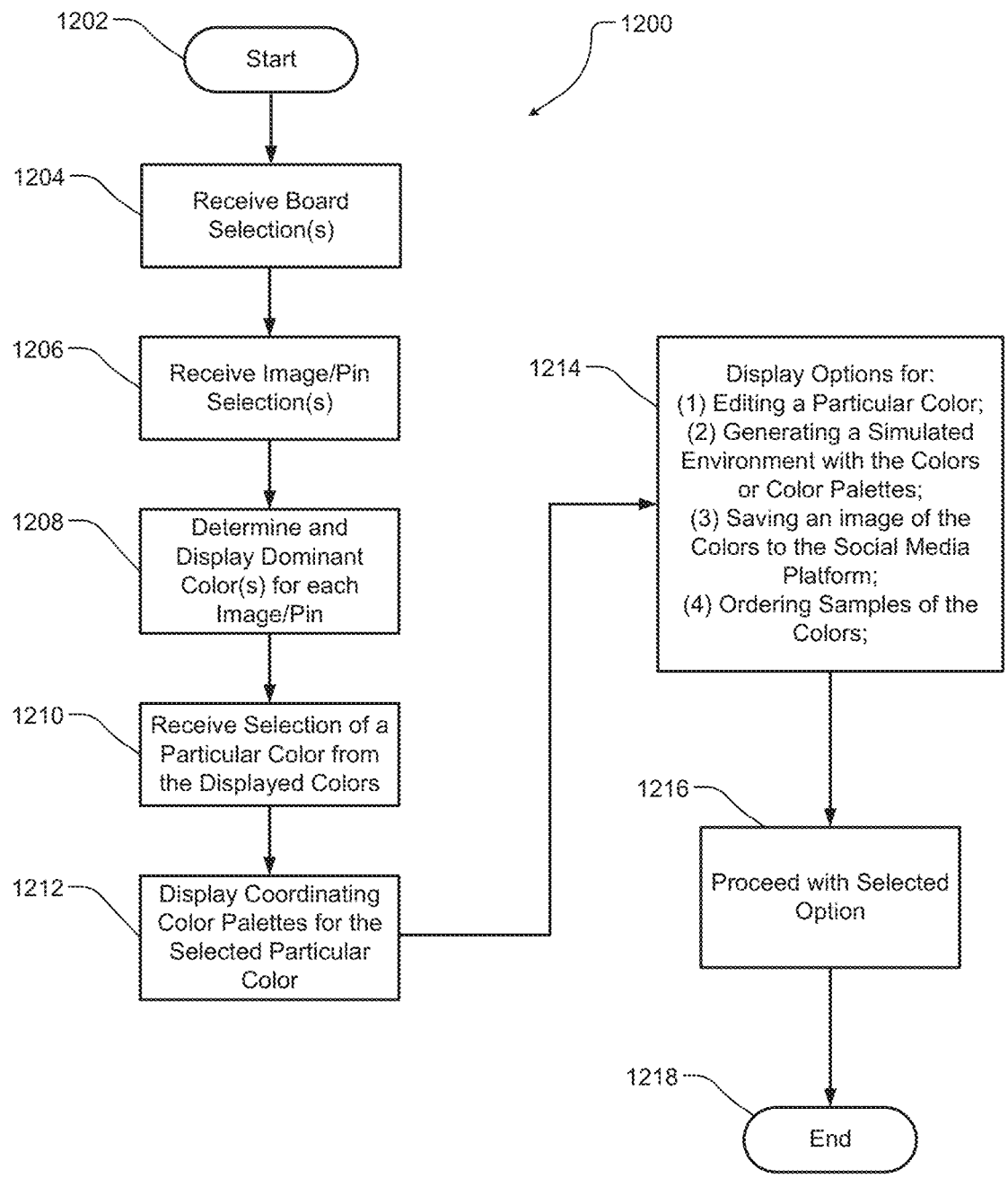
FIG. 12 is a flow chart for a method of analyzing colors from a social media platform according to the present disclosure.

With reference to FIG. 12, a flow chart for a method 1200 according to the present disclosure is illustrated. The method 1200 can be executed by the mobile device or tablet 14 and starts at 1202. At 1204, a particular board or group of images is received from the social media platform, as described in detail above with reference to FIG. 5. At 1206, particular images or pins are selected from the selected boards, as discussed in detail above with reference to FIG. 6.

At 1208, dominant colors for each of the images/pins selected in the previous step are determined and displayed, as described in detail above with reference to FIG. 7 and below with reference to FIGS. 13 to 15.

At 1210, a selection for a particular color from the group of displayed colors is received, as discussed in detail above with reference to FIGS. 7 and 8. At 1212, coordinating color palettes are displayed for the particular color selected, as discussed in detail above with reference to FIG. 8.

At 1212, options are displayed for: (1) editing a particular color, as discussed in detail above with reference to FIG. 8; (2) generating a simulated environment with the colors or color palettes, as discussed in detail above with reference to FIG. 7; (3) saving an image of the colors to the social media platform, as discussed in detail above with reference to FIGS. 7, 10, and 11; and (4) ordering samples of the colors, as discussed in detail above with reference to FIG. 7. At 1216, the selected option is carried out, as discussed in detail above with reference to the noted Figures. At 1218, the method 1200 ends.

In this way, the systems and methods of the present disclosure enable a user to quickly and efficiently retrieve and view colors from images saved and shared on a social media platform and, in particular, corresponding paint colors associated with the colors from the social media platform.

The systems and methods for analyzing colors in images retrieved from the social media platform may additionally track the particular images that are selected by individual users to analyze the types of images that users find helpful or inspirational in selecting paint colors, which may be helpful for determining the types of images to be used for marketing to the users. For example, once a particular image is selected by a user, the mobile device 14, or an additional server in communication with the mobile device 14, can utilize an image analysis tool to determine the content of the image and identify individual objects within the particular image. For example, the mobile device 14, or an additional server in communication with the mobile device 14, can utilize the CLOUD VISION API tool available through GOOGLE, which classifies images into categories, detects individual objects within the images (e.g., "sailboat," "lion," "Eiffel Tower," "living room," "tree," "beach," "sunset," etc.). For example, a particular image selected from the social media platform may have a particular Uniform Resource Locator (URL) associated with it. The system can retrieve the particular URL for the image and submit it to the image analysis tool, such as the CLOUD VISION API tool available through GOOGLE, which will analyze the image and output a listing of the individual objects detected in the image. The systems and methods of the present disclosure can then track and store the content present within the individual images selected by users and track any trends with respect to whether certain types of content with the image is selected more often than other types of content.

In this way, the systems and methods of the present disclosure can track whether particular objects in an image are more popular than other or, for example, more popular with certain types of users or users in a particular demographic. For example, the systems and methods of the present disclosure can analyze rankings for individual objects and determine trends for selections made by users within a certain demographic. For example, the systems and methods of the present disclosure may determine that images of tea kettles are popular with users in the northeast area of the United States. That information could then be used, for example, to create marketing materials showing images of tea kettles directed to users in the northeast area of the United States.

In addition, the systems and methods of the present disclosure can identify trends with respect to particular objects in an image selected by a particular user. For example, if a particular user most often selects images with objects such as trees, lakes, and beaches, the systems and methods of the present disclosure may determine that the particular user selects images with nature scenes more frequently than other scenes. In this way, the systems and methods of the present disclosure can identify the types of images that are popular for a particular user and/or can classify individual users based on their image selections. For example, the systems and methods of the present disclosure could classify a particular user in an "outdoor" group of users and then present targeting marketing to the particular user based on the classification. For example, users in the "outdoor" group of users may be presented with marketing that utilizes outdoor scenes, based on the identified classification.

Figure 13:
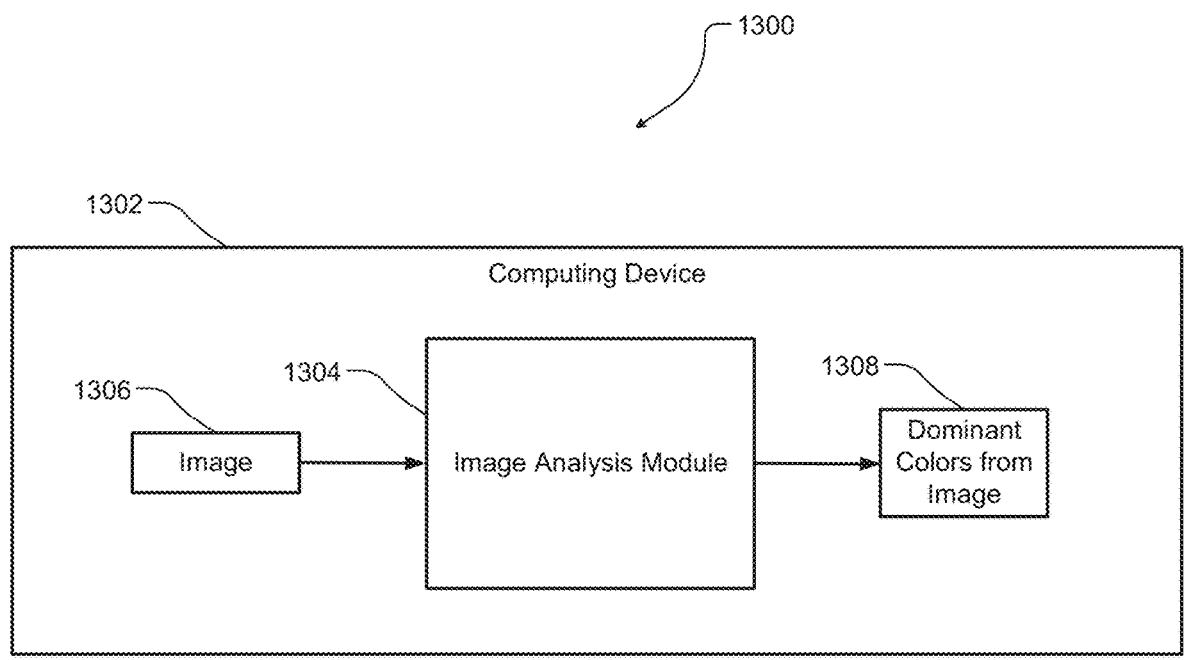
FIG. 13 is a block diagram of an image analysis system according to the present disclosure.
Figure 14:
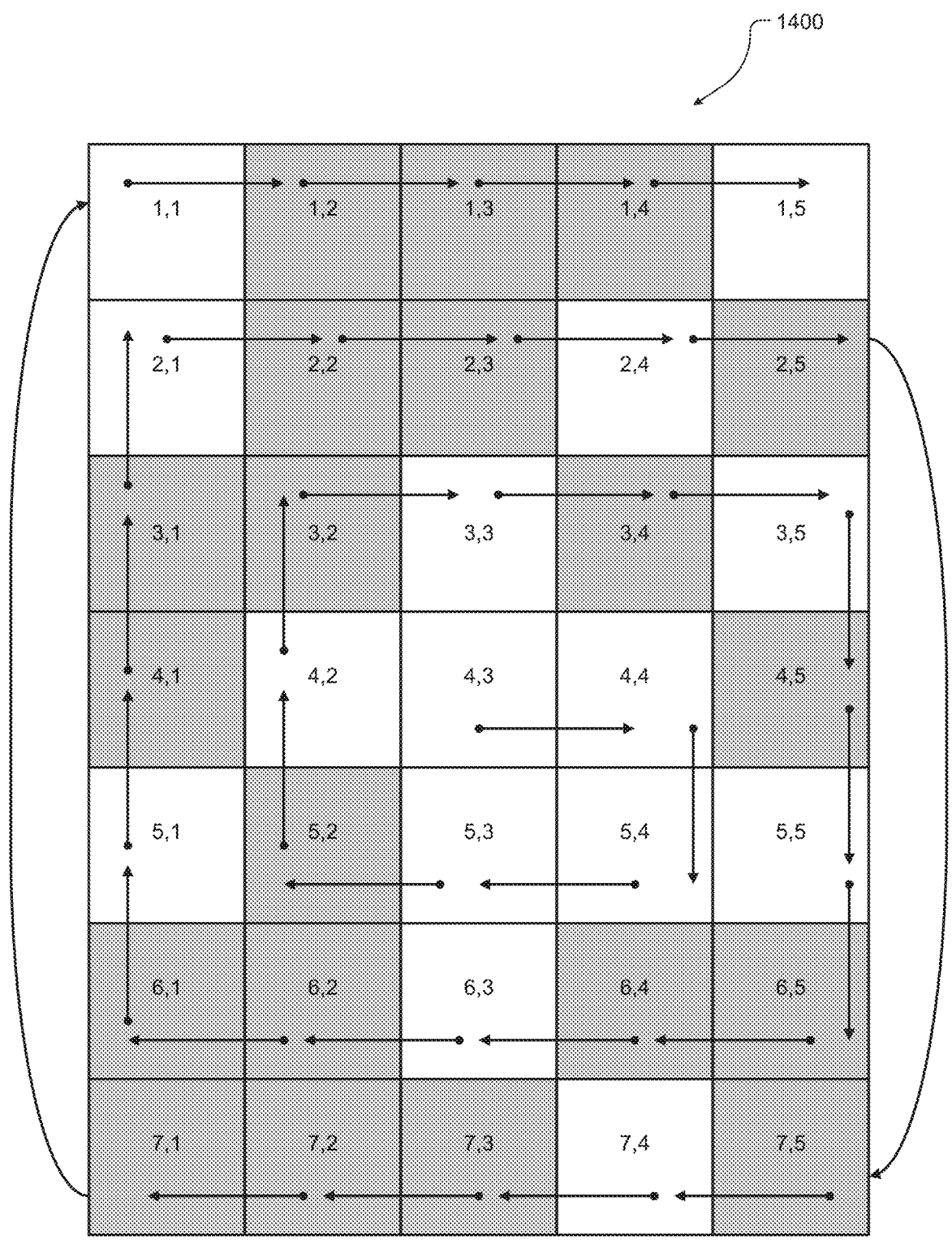
FIG. 14 is a diagram showing an analysis of pixels of an image by an image analysis system according to the present disclosure.
Figure 15:
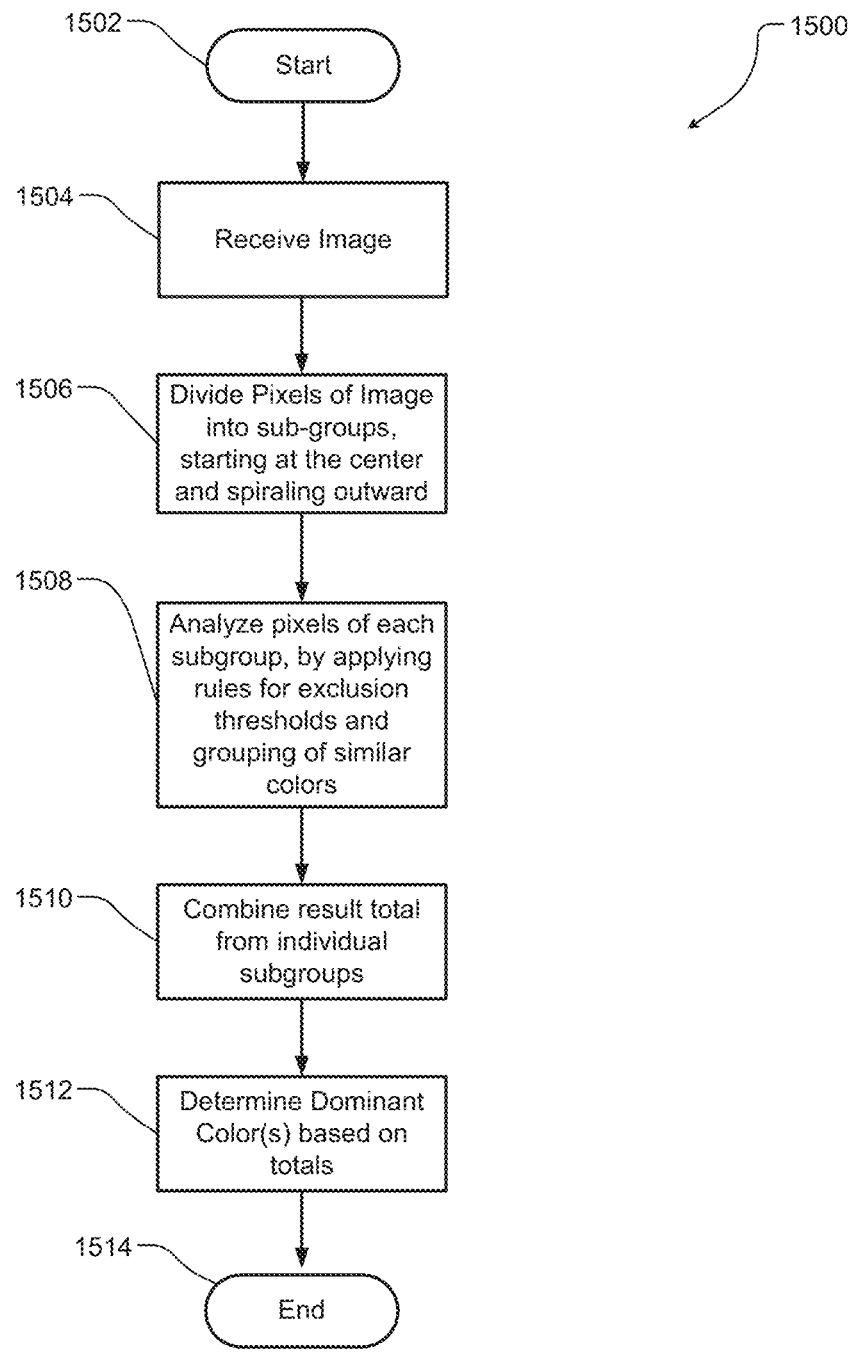
FIG. 15 is a flow chart for a method of analyzing images according to the present disclosure.

With reference to FIGS. 13 to 15, systems and methods for determining dominant colors in an image are shown. With reference to FIG. 13, a system 1300 for determining dominant colors in an image is shown. The system 1300 can include a computing device 1302. The computing device can be a personal computer, a laptop, a mobile device, a table, or another suitable computing device with a processor and memory for carrying out the functionality described herein. The computing device includes an image analysis module 1304. The image analysis module 1304, for example, can be implemented as part of the mobile application for the mobile device 14 described in detail above.

The image analysis module 1304 receives an image 1306 as input. The image analysis module 1304 analyzes the received image and generates output 1308 including one or more dominant colors from the image 1306.

In particular, the image analysis module 1304 analyzes individual pixels within an image file, starting at the center of the image and working outward from the center in a spiral fashion. As the image analysis module 1304 gets further from the center of the image, the sampling rate is decreased such that pixels towards the center of the image are sampled at a higher rate than pixels towards the edge of the image. In this way, the pixels near the center are weighted more heavily than pixels away from the center and towards the edge of the image. In addition, low level chroma colors, such as pixels with colors that are below a predetermined chroma value threshold, i.e., very dull or muted colors, are excluded. In addition, low lightness colors, such as pixels with a lightness level below a brightness threshold, i.e., very dark colors, are also excluded. Further, high lightness colors, such as pixels with a lightness level above a brightness threshold, i.e., very bright colors, are also excluded. All remaining sampled colors are counted, with similar colors being grouped together. The image analysis module 1304 then determines the color, or group of similar colors, with the highest count and returns that color, or a representative of the group of similar colors, as the dominant color for the image.

With reference to FIG. 14, an example image 1400 is shown broken up into individual pixel squares, labelled by column and row, in the format of: row, column. For example, the upper left pixel is labelled as row, column: 1,1. The upper right pixel is labeled as row, column: 1,5. The lower left pixel is labelled as row, column: 7,1. The lower right pixel is labelled as row, column 7,5.

In this example, the sequence of analysis is indicated by the arrows and starts in the center of the image at pixel 4,3. Pixels that are included in the analysis of the image are shown with a white square. Pixels that are skipped or excluded from the analysis are shown grayed out.

Starting from the center of the image 1400, the image analysis module 1304 includes the first four pixels (i.e., 4,3; 4,4; 5,4; and 5,3) in the analysis. Then, starting at pixel 5,2, the image analysis module 1304 begins to analyze every other pixel. In other words, after pixel 5,3, the next four pixels analyzed are pixels: 4,2; 3,3; 3,5; and 5,5. Then, starting at pixel 6,5, the image analysis module 1304 begins to skip two pixels for every one pixel included in the analysis. For example, after pixel 5,5, the next five pixels analyzed are pixels: 6,3; 5,1; 2,1; 2,4; and 7,4. Then, starting at pixel 7,4, the image analysis module 1304 begins to skip three pixels for every one pixel analyzed. As such, after 7,4, the next three pixels analyzed are pixels: 1,1 and 1,5.

In this way, the image analysis module 1304 decreases the pixel sample rate by skipping more and more pixels as it moves away from the center of the image. With respect to the remaining non-skipped pixels, the image analysis module 1304 applies the above described filters for low chroma values, low lightness values, and high lightness values. The remaining pixels are then analyzed with similar pixel colors being grouped together. Based on the number of colors or similar pixel color groups, the image analysis module then determines one or more dominant colors for the image 1400.

With reference to FIG. 15, a method 1500 for analyzing images according to the present disclosure is shown. The method 1500 can be executed by the image analysis module 1304 of the computing device 1302 and starts at 1502. At 1504, the image analysis module receives the image. At 1506, the image analysis module 1304 divides the pixels of the image into subgroups, with each of the subgroups being analyzed with a different sampling rate. Using the example image of FIG. 14, the first subgroup would include pixels: 4,3; 4,4; 5,4; and 5,3. The second subgroup would include pixels: 5,2; 4,2; 3,2; 3,3; 3,4; 3,5; 4,5; and 5,5. The third subgroup would include pixels: 6,5; 6,4; 6,3; 6,2; 6,1; 5,1; 4,1; 3,1; 2,1; 2,2; 2,3; 2,4; 2,5; 7,5; and 7,4. The fourth subgroup would include pixels: 7,3; 7,2; 7,1; 1,1; 1,2; 1,3; 1,4; and 1,5.

At 1508, the image analysis module analyzes the different subgroups using different sample rates. For example, every pixel of the first subgroup is analyzed. Every other pixel of the second subgroup is analyzed. Every third pixel of the third subgroup is analyzed. Every fourth pixel of the fourth subgroup is analyzed. While four different sampling rates for four different subgroups are described with reference to FIGS. 14 and 15, any number of subgroups of pixels and any number of sampling rates can be used. Further, the image analysis module 1304 can use different processing threads to perform the analysis of the various subgroups concurrently.

Also at 1508, the individual pixels are analyzed based on the exclusionary rules discussed above. For example, any pixels with colors having a chroma value that is below a chroma threshold and are too dull or muted are excluded. Any pixels with colors having a lightness value that is below a lightness threshold and are too dark are excluded. Any pixels with colors having a lightness value that is above a lightness threshold and are too bright are excluded. In addition, similar colors, i.e., colors that have hue, chroma, and lightness/darkness values that are within a predetermined threshold of each other, are grouped together. For each subgroup, the totals for the different colors or groups of similar colors are tallied by the image analysis module 1304.

At 1510, the totals from the individual subgroups are combined such that the same colors or similar color groups are added together.

At 1512, the image analysis module then determines the dominant color or colors based on the totals. In other words, the color or color group with the highest total is deemed the dominant color for the image.

The method ends at 1514.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terms server, user device, computing device, and module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The servers, user devices, apparatuses, and methods described in this application may be partially or fully implemented with or by one or more computer programs executed by one or more processors. The computer programs include processor-executable instructions that are stored on at least one non-transitory tangible computer readable medium. The computer programs may also include and/or rely on stored data.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A non-transitory computer readable medium storing computer executable instructions that, when executed by a processor of a computing device, configure the computing device to:
    receive an image;
    determine a dominant color for the image by dividing the image into a plurality of pixel groups, analyzing pixels in each of the pixel groups at different sample rates based on how close the pixel group is to the center of the image with pixel groups closer to the center of the image having a higher sample rate, and determining the dominant color for the image based on the analyzed pixels in each of the pixel groups;
    determine a closest matching paint color for the dominant color for the image; and
    display at least one of a color name and a color code associated with the closest matching paint color for the dominant color of the image.

2. The non-transitory computer readable medium recited by claim 1, wherein the computer executable instructions, when executed by the processor of the computer device, further configure the computing device to access a social media platform and retrieve the image from the social media platform.

3. The non-transitory computer readable medium recited by claim 1, wherein the computing device is a mobile device and the computer executable instructions are included in a mobile application that is configured for execution by the mobile device.

4. The non-transitory computer readable medium recited by claim 1, wherein the computer executable instructions are configured for execution within a web browser of the computing device.

5. The non-transitory computer readable medium recited by claim 1, wherein the computer executable instructions are included in a web application that is configured for execution within a web browser of the computing device and wherein a web server is further configured to communicate the computer executable instructions to the computing device by communicating the web application to the computing device.

6. The non-transitory computer readable medium recited by claim 1, wherein the computing device is one of a personal computer, a laptop, a tablet, and a mobile device.

7. The non-transitory computer readable medium recited by claim 1, wherein the computer executable instructions, when executed by the computing device, further configure the computing device to determine and display a plurality of coordinating paint colors for the closest matching paint color for the dominant color of the image.

8. The non-transitory computer readable medium recited by claim 1, wherein the computer executable instructions, when executed by the user device, further configure the user device to enable a user to select a different color than the dominant color for the image, to determine a closest matching color for the different color, and to display at least one of a color name and a color code associated with the closest matching color for the different color.

9. A method comprising:
    receiving, with a computing device, an image;
    determining, with the computing device, a dominant color for the image by dividing the image into a plurality of pixel groups, analyzing pixels in each of the pixel groups at different sample rates based on how close the pixel group is to the center of the image with pixel groups closer to the center of the image having a higher sample rate, and determining the dominant color for the image based on the analyzed pixels in each of the pixel groups;
    determining, with the computing device, a closest matching paint color for the dominant color for the image; and
    displaying, with the computing device, at least one of a color name and a color code associated with the closest matching paint color for the dominant color of the image.

10. The method recited by claim 9, further comprising:
accessing, with the computing device, a social media platform; and
retrieving, with the computing device, the image from the social media platform.

11. The method recited by claim 9, wherein the computing device is a mobile device.

12. The method recited by claim 9, wherein the computing device is one of a personal computer, a laptop, a tablet, and a mobile device.

13. The method recited by claim 9, further comprising:
determining and displaying, with the computing device, a plurality of coordinating paint colors for the closest matching paint color for the dominant color of the image.

14. The method recited by claim 9, further comprising:
receiving, with the computing device, a selection for a different color than the dominant color for the image;
determining, with the computing device, a closest matching color for the different color; and
displaying, with the computing device, at least one of a color name and a color code associated with the closest matching color for the different color.

15. A system comprising:
a computing device including a non-transitory computer readable medium storing computer executable instructions that, when executed by a processor of the computing device, configure the computing device to:
receive an image;
determine a dominant color for the image by dividing the image into a plurality of pixel groups, analyzing pixels in each of the pixel groups at different sample rates based on how close the pixel group is to the center of the image with pixel groups closer to the center of the image having a higher sample rate, and determining the dominant color for the image based on the analyzed pixels in each of the pixel groups;
determine a closest matching paint color for the dominant color for the image; and
display at least one of a color name and a color code associated with the closest matching paint color for the dominant color of the image.

16. The system recited by claim 15, wherein the computer executable instructions, when executed by the processor of the computer device, further configure the computing device to access a social media platform and retrieve the image from the social media platform.

17. The system recited by claim 15, wherein the computing device is a mobile device and the computer executable instructions are included in a mobile application that is configured for execution by the mobile device.

18. The system recited by claim 15, wherein the computer executable instructions are configured for execution within a web browser of the computing device.

19. The system recited by claim 15, wherein the computer executable instructions are included in a web application that is configured for execution within a web browser of the computing device and wherein a web server is further configured to communicate the computer executable instructions to the computing device by communicating the web application to the computing device.

20. The system recited by claim 15, wherein the computing device is one of a personal computer, a laptop, a tablet, and a mobile device.

21. The system recited by claim 15, wherein the computer executable instructions, when executed by the computing device, further configure the computing device to determine and display a plurality of coordinating paint colors for the closest matching paint color for the dominant color of the image.

22. The system recited by claim 15, wherein the computer executable instructions, when executed by the user device, further configure the user device to enable a user to select a different color than the dominant color for the image, to determine a closest matching color for the different color, and to display at least one of a color name and a color code associated with the closest matching color for the different color.

* * * * *